(12) United States Patent
Harihara Gupta et al.

(10) Patent No.: US 12,509,116 B2
(45) Date of Patent: Dec. 30, 2025

(54) TUNING PARAMETERS USED FOR GENERATING SIMULATED DRIVING TESTS

(71) Applicant: GM Cruise Holdings LLC, San Francisco, CA (US)

(72) Inventors: Omnaath Guptha Harihara Gupta, Livermore, CA (US); Yeshaswi Laxman Menghmalani, Milpitas, CA (US); Ritchie Lee, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 233 days.

(21) Appl. No.: 18/325,929

(22) Filed: May 30, 2023

(65) Prior Publication Data
US 2024/0400100 A1 Dec. 5, 2024

(51) Int. Cl.
*B60W 60/00* (2020.01)
*B60W 50/00* (2006.01)

(52) U.S. Cl.
CPC .... *B60W 60/0015* (2020.02); *B60W 50/0098* (2013.01); *B60W 2050/0005* (2013.01)

(58) Field of Classification Search
CPC ......... B60W 60/0015; B60W 50/0098; B60W 2050/0005; G06N 3/00
See application file for complete search history.

(56) References Cited

U.S. PATENT DOCUMENTS

| 11,702,106 B1* | 7/2023 | Poubel Orenstein ....................... G05D 1/0088 701/26 |
| 2018/0300964 A1* | 10/2018 | Lakshamanan ....... G06F 9/5027 |
| 2018/0307583 A1* | 10/2018 | Yang ..................... G06F 11/368 |
| 2018/0339712 A1* | 11/2018 | Kislovskiy .............. H04L 67/34 |
| 2019/0291728 A1* | 9/2019 | Shalev-Shwartz .... B60W 40/06 |
| 2020/0118441 A1* | 4/2020 | Han ........................ G06N 20/00 |
| 2021/0122383 A1* | 4/2021 | Yi ..................... B60W 50/0205 |

(Continued)

FOREIGN PATENT DOCUMENTS

| CN | 110214264 A | * | 9/2019 | ............. G06Q 10/00 |
| CN | 112345272 A | * | 2/2021 | |

(Continued)

OTHER PUBLICATIONS

CN-112345272-A translation (Year: 2021).*

(Continued)

*Primary Examiner* — Kyle T Johnson
(74) *Attorney, Agent, or Firm* — CANTOR COLBURN LLP

(57) ABSTRACT

Tools can generate simulated driving tests that allow a same driving scenario to be tested at different geographical locations and with different arrangements of simulated road user(s) and/or simulated road objects. Numerous parameters used by these tools for creating the simulated driving tests can impact the usefulness of the simulated driving tests. If the parameters are not set appropriately, the simulated driving tests may not result in critical interactions that would enable accurate assessment of vehicle software. To alleviate some of these concerns, a parameter tuning system can find (Continued)

optimal value ranges of parameters based on criticality scores of generated simulated driving tests, so that better simulated driving tests can be obtained.

20 Claims, 8 Drawing Sheets

(56) References Cited

U.S. PATENT DOCUMENTS

| | | | | |
|---|---|---|---|---|
| 2021/0309254 | A1* | 10/2021 | Murahashi | B60W 60/0015 |
| 2023/0112004 | A1* | 4/2023 | Hari | B60W 60/0015 |
| | | | | 701/23 |
| 2023/0260394 | A1* | 8/2023 | Kohara | B60W 40/04 |
| | | | | 701/119 |
| 2023/0365145 | A1* | 11/2023 | Markofsky | B60W 50/0098 |
| 2024/0051575 | A1* | 2/2024 | Lee | G06N 7/01 |
| 2024/0400100 | A1* | 12/2024 | Harihara Gupta | G06N 3/00 |

FOREIGN PATENT DOCUMENTS

| | | | | |
|---|---|---|---|---|
| CN | 113788029 | A | * 12/2021 | |
| CN | 117382674 | A | * 1/2024 | |
| DE | 102018105665 | A1 | * 9/2018 | B60W 50/0098 |
| DE | 202019006068 | U1 | * 8/2024 | B60W 10/06 |
| EP | 4063214 | A1 | * 9/2022 | B60W 50/0097 |

OTHER PUBLICATIONS

CN-113788029-A translation (Year: 2021).*
CN-117382674-A translation (Year: 2024).*
DE-102018105665-A1 translation (Year: 2018).*
CN-110214264-A translation (Year: 2019).*
DE-202019006068-U1 translation (Year: 2024).*
Westhofen et al., *Criticality Metrics for Automated Driving: A Review and Suitability Analysis of the State of the Art*, Archives of Computational Methods in Engineering, https://doi.org/10.1007/s11382-022-09788-7, Published Online Aug. 1, 2022, 35 pages.
Wang et al., *Potential Risk Assessment for Safe Driving of Autonomous Vehicles Under Occluded Vision*, Nature Portfolio, Scientific Reports, https://doi.org/10.1038/s41598-022-08810-z, 2022, 12:4981 14 pages.
Nalic et al., *Criticality Assessment Method for Automated Driving Systems by Introducing Fictive Vehicles and Variable Criticality Thresholds*, MDPI, Sensors, 2022, 22, 8780, https://doi.org10.3390/s22228780, 15 pages.

* cited by examiner

TUNING PARAMETERS USED FOR GENERATING SIMULATED DRIVING TESTS

BACKGROUND

Technical Field

The present disclosure generally relates to autonomous driving and, more specifically, generation of simulated driving scenarios that can help evaluate and improve autonomous driving software.

Introduction

An autonomous vehicle (AV) is a motorized vehicle that can navigate without a human driver or with little human assistance. An exemplary AV can include various sensors, such as a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
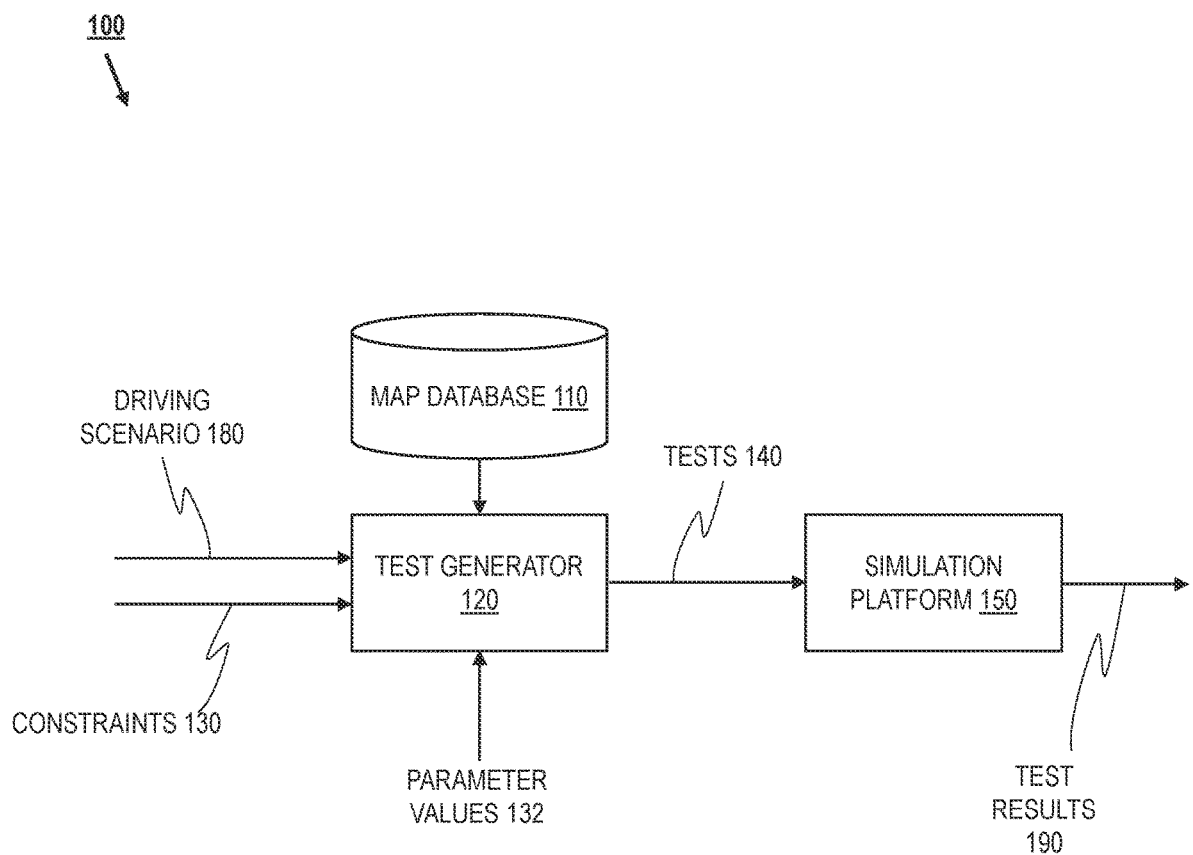
FIG. 1 illustrates a simulation system, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Tools can generate simulated driving tests that allow a same driving scenario to be tested at different geographical locations and with different arrangements of simulated road user(s) and/or simulated road objects. Driving scenarios can include a lane change, an unprotected left turn (UPL), navigating around a construction area or roadblock, reacting to a broken traffic light, trying to drive through an intersection while a traffic light is occluded, reacting to emergency personnel directing traffic, driving in a roundabout, reacting to an animal crossing, a zipper merge, etc. Simulated road users can include other vehicles, pedestrians, animals, bicyclists, motor cyclists, emergency personnel, etc. Simulated road objects can include debris, trash cans, traffic cones, traffic signs, vegetation, snow, puddles, potholes, dead animals, speed bumps, barricades, etc. A simulated ego vehicle can be placed in the simulated driving tests, and the results can be recorded and observed.

As used herein, an ego vehicle refers to a vehicle of interest, and other vehicles may be in the surroundings of the ego vehicle. In simulated driving tests, the simulated ego vehicle is the vehicle at the center of a simulation, where the AV stack of the simulated ego vehicle may be emulated in the simulation. The simulation is aimed at testing and evaluating the performance and behavior of the ego vehicle (and not the surrounding vehicles). Other surrounding vehicles may be modeled using a kinematic model and behavior model, and the surrounding vehicles are not being tested or evaluated. The word "ego" can be used to refer to the reference vehicle having sensors which can sense the environment surrounding the vehicle and autonomous driving capabilities such as perception.

Users may be responsible for creating suites of simulated driving tests that can allow AV software to be evaluated using the suites of simulated driving tests. Simulated driving tests can expose and identify failure modes of the AV software (e.g., situations or modes in which the AV is not performing according to specifications/requirements), which later can enable developers for AV software to improve the AV software to address the failure modes. Improvements made by the developers to the AV software can be validated and evaluated through the suites of simulated driving tests.

Numerous parameters used by the tools for creating the simulated driving tests can impact the usefulness of the simulated driving tests. If the parameters are not set appropriately, the simulated driving tests may not result in critical interactions that would enable accurate assessment of vehicle software. For example, it can be a challenge to determine values for parameters such as initial speed and initialization times, that would lead to a critical interaction.

A critical interaction may include a situation where a simulated ego vehicle and another vehicle arrive at a scene during a critical interaction time period. A critical interaction time period may be a period of time in a simulated driving test where conditions or circumstances for a critical interaction are present. For example, if a simulated driving test intends to capture an AV performing a UPL at an intersection, a critical interaction time period may be a time period where another vehicle driving in the opposite direction as the ego vehicle is approaching or in the intersection. A critical interaction for this simulated driving test may involve the ego vehicle arriving during a time period where the other vehicle is near or in the intersection. In some cases, the ego vehicle may not arrive in time due to an occlusion (the other vehicle has already passed through the intersection) and may have slowed down before performing a UPL. In such cases, the ego vehicle and the other vehicle did not arrive at the scene during a critical interaction time period, and the simulated driving test did not result in a critical interaction.

In some cases, the generated simulated driving tests may not capture the driving scenario or the intent of these tests. Users can spend a great deal of time approximating or guessing the values of these parameters. The trial-and-error process may be time consuming and computationally expensive. Visually reviewing a replayed simulated driving test to confirm whether a given simulated driving test has captured a driving scenario or the intent of the test can be time consuming and subjective. The manual and repeated adjustment to the parameters may result in costly runs where many simulated driving tests that do not result in critical interactions are generated and executed.

To alleviate some of these concerns, a parameter tuning system can find optimal value ranges of parameters based on criticality scores of the simulated driving tests. Criticality scores or criticality metrics are quantitative (not qualitative) measures that can indicate whether a critical interaction occurred in a simulated driving test. Criticality scores may computationally assess safety of the ego vehicle and other vehicles/objects in a simulated driving test. Criticality scores may computationally assess the comfort of the ego vehicle and other vehicles/objects in a simulated driving test. Criticality scores may computationally assess the risk of collision between the ego vehicle and other vehicles/objects in a simulated driving test. Criticality scores may have numerical values that indicate different levels of criticality. Criticality scores may be different depending on the intent of the simulated driving tests. An optimization algorithm can use the computed criticality scores to objectively find value ranges of the parameters that would yield simulated driving tests that result in critical interactions. In some cases, the metrics of the simulated driving tests can be determined and tracked. Metrics can offer objective information on how well a suite of simulated driving tests capture a certain driving scenario.

The parameter tuning system can offer one or more benefits. Such parameter tuning systems can allow users to obtain better simulated driving tests that achieve a critical interaction with higher confidence. The parameter tuning system can save users' time from having to adjust the values of the parameters and confirm whether the simulated driving tests are useful. The parameter tuning system can save computational resources from being used for generating and/or executing simulated driving tests that are not meaningful. The parameter tuning system can curate a suite of simulated driving tests that is designed for a specific intent and capture a specific sequence of events and critical interactions. If the intent changes or diverges during AV software development, the parameter tuning system can be used to curate an updated suite of simulated driving tests.

Simulation Systems for Training and/or Testing AV Software

AVs can encounter a wide variety of situations while driving, such as different roadway geometries, different locations of other vehicles and pedestrians, different behaviors of vehicles and pedestrians, etc. Real-world road tests are typically used to train AV software how to respond in various situations. However, real-world road tests may not encounter every possibility, which can leave edge cases that AV software may not have been trained to handle. Also, real-world road tests can be expensive and time consuming to conduct. Simulations can be used to train the AV for a variety of situations, including interesting and rare situations. Simulations can be used to evaluate performance and safety of AV software under a variety of situations, including edge cases.

Simulation can be used to improve AV software and to expand the use of AVs having the AV software in new environments, or operational design domains (ODDs). AVs can be tested by driving fleets of vehicles with AV sensor systems in a particular environment (e.g., a particular city). Over time, real-world road miles and simulation can expose the AV software to the specific roadways within the environment, along with different driving scenarios along the roadways. AV software may be exposed to, through real-world road miles and simulation, situations that may have, for example, different numbers and locations of nearby vehicles, different kinematic behaviors (e.g., maneuvers, speeds) of other vehicles, simulated and/or real-world road users, simulated and/or real-world road objects in the environment (e.g., pedestrians, bicycles, debris, emergency personnel, animals), roadway variations (e.g., lanes closed for construction, different types of intersections), etc. While real-world testing is important to training and evaluating AV software, it can be difficult to expose AVs to every situation that may arise. Driving AVs to collect extensive road miles for validating AV software releases can be expensive. Relying solely on real-world road miles for exposure to a wide range of driving scenarios can also make it difficult to scale AV fleets, e.g., to introduce AVs in new cities. With simulation, testing and evaluation of AV software can be performed with substantial reduction in or possibly eliminate the need to collect extensive real-world road miles.

Simulation can be used to provide additional training for machine learning models of AV software. Simulation can also offer a simulated testing/evaluation environment for testing, evaluating, and validating AV software. An exemplary simulation system 100 is illustrated in FIG. 1. Simulation system 100 can generate simulated driving tests based on real-world road data and/or simulated (e.g., artificially created) road data. Simulation system 100 can generate and execute simulated driving tests that test AV software operating in a driving scenario at one or more geographic locations. A simulated ego vehicle having some version of the AV software can be placed in the driving scenario, and the performance and/or safety of the AV software can be tested, evaluated, and assessed at various geographic locations of interest and under varied situations. In one example, the driving scenario of interest is an unprotected left turn. Simulation system 100 can generate simulated driving tests at various intersections of a particular ODD. Simulation system 100 may vary the situations in the simulated driving tests (e.g., changing kinematics of the simulated ego vehicle, varying the number of pedestrians on the road). Simulation system 100 can execute the simulated driving tests by placing a simulated ego vehicle at various intersections to perform a UPL. By performing many simulated driving tests, it is possible to identify a failure mode that may be specific to certain kinds of situations (e.g., obtuse-angled intersection, presence of bicyclists).

The simulation system 100 can include a map database 110, a test generator 120, and a simulation platform 150. The map database 110 includes data describing roadways, such as locations of roads, connections between roads, geometric information (e.g., road and lane widths, slopes, angles between roads, road names, speed limits, traffic flow regulations, toll information, etc. The map database 110 may also include data describing other features in or along the roads, such as bike lanes, sidewalks, crosswalks, traffic lights, stop signs, parking spaces, medians, etc. The map database 110 may further include data describing other features in the environments of the roads, such as data describing buildings (e.g., locations of buildings, building geometry, building types), trees, other signage, guardrails, streetlamps, lighting at different times of day, etc. The map database 110 may include data for a specific geographic area (e.g., a particular city, state, or other service area), or the map database 110 may include data across multiple geographic areas (e.g., multiple cities, all mapped portions of a country or the world, etc.). In some cases, the map database 110 may include multi-dimensional models of the roadways and the environments of the roads. The multi-dimensional models may include descriptions of surfaces (e.g., geometries, roughness, reflectiveness). In some cases, the map database 110 may include real-world road data and/or artificially created road data that corresponds to various geographical locations. Real-world road data may include sensor data collected by vehicles with a sensor suite at various geographical locations. Artificially created road data may include sensor data that is artificially generated based on one or more of: data describing roadways, data describing features in or along the roads, and data describing other features in the environments of the roads.

The test generator 120 can identify one or more specific geographical locations in the map database 110 and generate simulated driving tests for simulating a driving scenario 180. The test generator 120 may be implemented by one or more computer systems, e.g., the processor-based system illustrated in FIG. 8. The test generator 120 can select a geographical location, or set of geographical locations, in the map database 110 that match a driving scenario 180. For example, if the driving scenario 180 is a UPL, the test generator 120 may identify one or more geographical locations that has a UPL lane and allows UPLs. The test generator 120 may take one or more constraints 130 into account when selecting the one or more geographical locations from the map database 110. The constraints 130 limit the selection of geographical locations for the test generator 120. For example, the constraints 130 may indicate that a user would like to execute simulated driving tests at three-way intersections with two stop signs. The test generator 120 may search the map database 110 to find locations that meet the constraints 130.

Having found the matching locations, the test generator 120 can generate simulated driving tests at the identified location(s). A simulated driving test can include data that enables a simulation platform to place a simulated ego vehicle with a version of the AV software in the simulated driving test, let the simulated ego vehicle drive in the simulated driving test, and observe the results. Different simulated driving tests can be generated so that the situations in the simulated driving tests can be varied. To vary the situations in the simulated driving tests, a user may provide different parameter values 132 for parameters, such as other vehicle types, vehicle locations, vehicle speeds, pedestrian activity, etc. Some parameter values 132 may be continuous. Some parameter values 132 may specify a range of values (e.g., having an upper bound and a lower bound). Some parameter values 132 may be discrete. Some illustrative examples of parameters are described with FIGS. 3-5. Example of parameters can include:

Initial velocity of a simulated ego vehicle,
Initial acceleration of a simulated ego vehicle,
Initial position of a simulated ego vehicle (e.g., coordinates in virtual-world environment, lane interpolation),
Initial direction of travel for a simulated ego vehicle,
Initial velocity of a simulated road user or a simulated road object,
Initial acceleration of a simulated road user or a simulated road object,
Initial position of a simulated road user or a simulated road object (e.g., coordinates in virtual-world environment, lane interpolation),
Initial direction of travel for a simulated road user or a simulated road object,
Distance between a simulated ego vehicle and a simulated road user or a simulated road object,
Number of instances of a simulated road user or a simulated road object,
Size of a simulated road user or a simulated road object,
Physical property of a simulated road user or a simulated road object,
Time of day,
Weather conditions (including inclement weather conditions),
Atmospheric conditions,
Type of simulated road user or a type of a simulated road object,
Number of occlusions,
Size of an occlusion, and
Whether it is nighttime, daytime, twilight, dusk, or dawn.

In some cases, the parameter values 132 may define or specify a particular situation, e.g., a simulated ego vehicle is approaching a stop sign in the 3-way intersection at distance X with speed A, and another vehicle at position Y at speed B approaches from the road without a stop sign. The test generator 120 can generate various permutations of the situation as specified by the parameter values 132 as simulated driving tests, e.g., including other vehicles in front of or behind the AV, a vehicle approaching from the third roadway, different pedestrian activity, different lighting conditions, etc.

The test generator 120 may output the generated simulated driving tests 140 (referred to generally as "tests") to a simulation platform 150. The tests 140 may be in the form of data files, which the simulation platform 150 may use to execute simulated driving tests. The tests 140 may specify elements of a virtual-world environment in which the simulated ego vehicle would drive. The data files may include data from the map database 110, or data identifying relevant data in the map database 110. The data files may encode data of the locations of simulated road users and/or simulated road objects in the scene (e.g., the locations of the AV, other vehicles, pedestrians, bicycles, etc.). For example, the data files may include a three-dimensional simulation matrix encoding the environment of the simulated ego vehicle, or a two-dimensional map encoding the environment of the simulated ego vehicle. Additional data in the data files may encode simulated road users and/or simulated road object kinematics (e.g., velocities, acceleration) and behaviors (e.g., planned trajectories).

The simulation platform 150 can enable testing, evaluation, and validation of AV software, such as autonomous driving algorithms, in a variety of different virtual-world environments. Simulation platform 150 can simulate behavior of a simulated ego vehicle in the test 140 where the simulated ego vehicle is running a version of the AV software. Simulation platform 150 can generate a virtual-world environment based on data from the tests 140 and let the simulated ego vehicle react to the virtual-world environment. The simulation platform 150 can simulate the physics of the virtual-world environment, including the physics of the simulated ego vehicle, simulated road users, and/or simulated road objects. In some embodiments, the tests 140 may include or reference data captured by AVs, e.g., rendering geospatial information and road infrastructure (e.g., streets, lanes, crosswalks, traffic lights, stop signs, etc.) obtained from the map database 110. In some embodiments, the simulation platform 150 may model behavior of other simulated road users and/or simulated road objects (e.g., vehicles, bicycles, pedestrians, debris) in the virtual-world environment. In some embodiments, the simulation platform 150 may emulate sensors on the simulated ego vehicle to measure and generate sensor data in response to the virtual-world environment produced by the simulation platform 150.

The simulation platform 150 can simulate the simulated ego vehicle's behavior in a simulated driving test and can output test results 190 of the simulated driving test execution. For example, during execution of a simulated driving test, the simulation platform 150 may place the simulated ego vehicle in the simulated driving test (e.g., a virtual-world environment specified by the simulated driving test) and collect one or more data files that records results 190 of the simulated ego vehicle driving in the virtual-world environment using a version of the AV software. The results 190 of the simulated driving test execution may include various locations and/or kinematics data of the simulated ego vehicle, other vehicle(s), other simulated road users, and/or simulated road objects during the simulated driving test execution. In some cases, the final locations of the simulated ego vehicle, other vehicle(s), other simulated road users, and/or simulated road objects at the end of the simulated driving test execution may be recorded as a part of results 190. The results 190 of the simulated driving test execution may include logs of the simulated ego vehicle (e.g., sensor logs, data logs, etc.).

The results 190 may be evaluated and analyzed to better understand the performance and/or safety of a version of the AV software, e.g., for a specific driving scenario, for a specific ODD, for a specific type of situation, for a certain failure mode. The results 190 may allow certain failure modes to be identified. Identifying safety risks from results 190 may offer more visibility into progression and/or regressions of AV software. Results 190 can be analyzed to generate risk projections or risk estimates, which can be used to limit where an AV may operate and/or what an AV may do in the real-world. For example, risk projections or risk estimates obtained from results 190 may limit whether an AV may be allowed to be routed to drive through a roundabout. The quality of results 190 may depend on the quality of the simulated driving tests 140 that were used to produce results 190.

Challenges to Parameter Tuning

The test generator 120 can generate a very large number of tests 140. If the value range specified for a certain parameter of test generator 120 is large, test generator 120 may generate a very large number of tests 140. The test generator 120 may also generate a very large number of tests 140 having different permutations or combinations of values for the parameters. If the constraints 130 result in a lot of matching locations (e.g., a four-way stop, or a two-lane highway), the test generator 120 may generate many tests at each of the matching locations, which can output a very large number of tests 140.

Haphazardly setting of parameter values 132 may result in many simulated driving tests to be generated and executed, potentially consuming a lot of computing resources. Moreover, depending on the values for the parameters, some tests 140 may not capture a driving scenario, or a certain driving scenario fails to occur during execution. Depending on the parameter values 132 provided to test generator 120 to generate tests 140, some tests 140 may not result in a critical interaction of the simulated ego vehicle with other simulated road users and/or simulated road objects. If the parameter values 132 provided to test generator 120 are not set by the user carefully, only very few tests out of thousands of tests may result in a critical interaction. Execution of some simulated driving tests that do not capture the driving scenario or fails to result in a critical interaction may not offer meaningful insight for assessing the performance and/or safety of AV software, thereby making it more difficult to improve AV software. Users may spend time to make educated guesses on the parameter values 132 (which may be very difficult to do when many parameters may be involved) and repeatedly fail to generate tests 140 that capture the driving scenario and result in a critical interaction. Computing resources may be wasted on executing simulated driving tests that do not capture the driving scenario or do not result in a critical interaction. Besides wasting computing resources, significant time may be spent by the user visually inspecting the simulated driving tests 140 executions to confirm whether the driving scenario has been captured and whether a critical interaction has occurred in a given simulated driving test.

Exemplary Parameter Tuner

Figure 2:
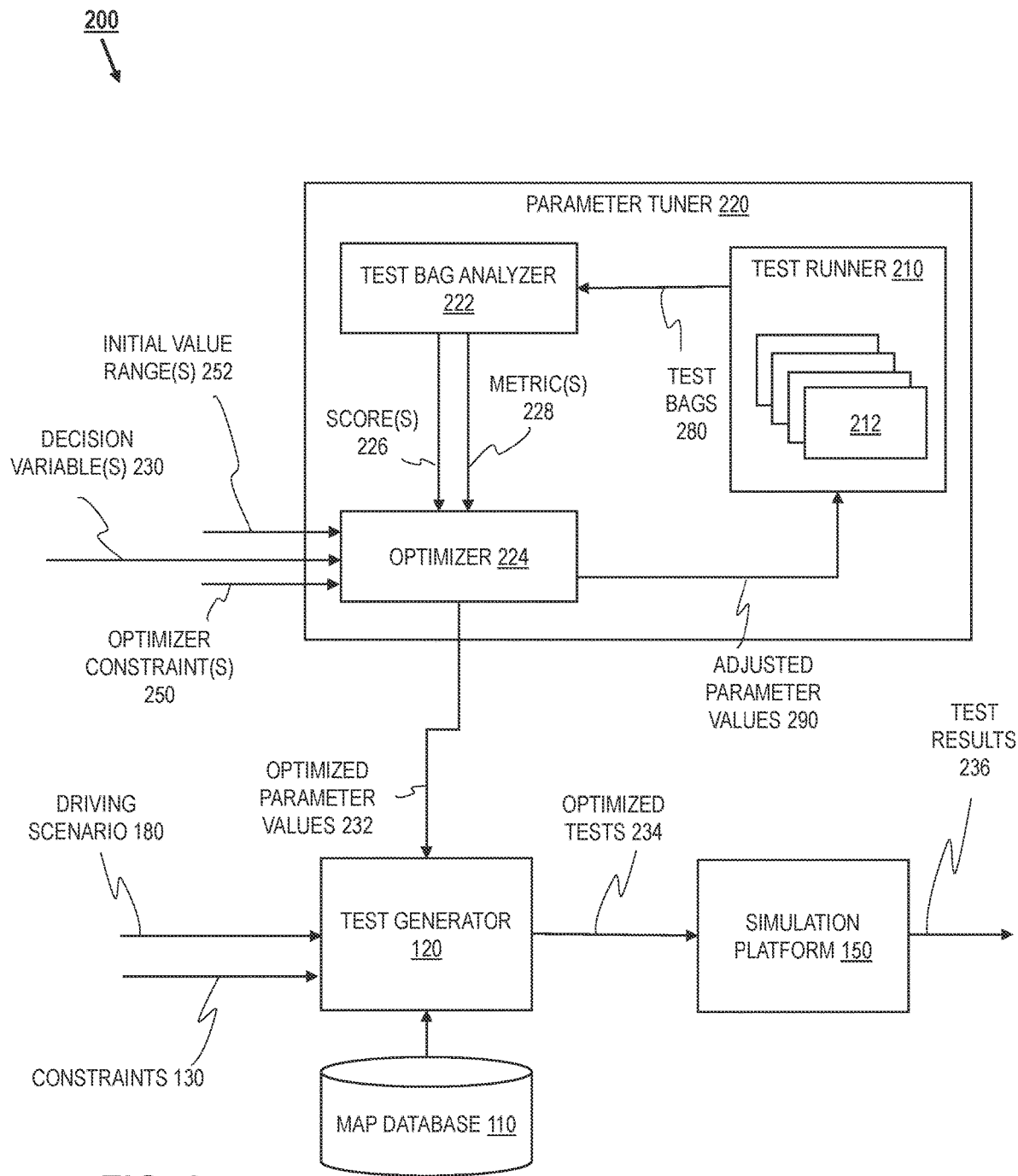
FIG. 2 illustrates a simulation system with a parameter tuner, according to some aspects of the disclosed technology.

FIG. 2 illustrates a simulation system 200 with a parameter tuner 220, according to some aspects of the disclosed technology. Parameter tuner 220 can identify optimized parameter values 232, which can be used by test generator 120 to generate an optimized suite of simulated driving tests 234 simulated driving tests. Parameter tuner 220 can curate simulated driving tests that capture a driving scenario and/or achieves a critical interaction by identifying simulated driving tests that were generated using the optimized parameter values 232 and filter out simulated driving tests that were not generated using the optimized parameter values 232. The curated suite of simulated driving tests can then be published and executed by the simulation platform 150, e.g., to test, evaluate, and validate performance and/or safety of a version of AV software.

Parameter tuner 220 includes an optimizer 224, a test runner 210, and a test bag analyzer 222. The parameter tuner 220, the optimizer 224, the test runner 210, and the test bag analyzer may be implemented by one or more computer systems, e.g., the processor-based system illustrated in FIG. 8.

A user may provide one or more decision variables 230 for optimizer 224. One or more decisions variables 230 correspond to one or more parameters that test generator 120 may use to vary situations in the simulated driving tests. The user may direct optimizer 224 to find optimal values or optimal value ranges for the one or more decision variables 230 that would optimize the value of an objective function. A user may provide one or more optimizer constraint(s) 250 to optimizer 224 to constrain the search for optimal values by the optimizer 224. The user may provide one or more initial value range(s) 252 to optimizer 224 to guide the search for optimal values. Optimizer 224 may edit a data file to implement the optimal values, so that the data file can be used by test generator 120 to generate optimized tests 234. Simulation platform 150 can execute the optimized tests 234 to generate test results 236 that evaluates performance and/or safety of a version of AV software.

Optimizer 224 may trigger a batch 212 of simulated driving tests to be executed by test runner 210 as part of the optimization algorithm. Optimizer 224 may trigger additional batches of simulated driving tests to be executed by test runner 210 if needed to determine the optimized parameter values 232. Optimizer 224 may determine values to try and provide the values as adjusted parameter values 290 to trigger a batch 212 of simulated driving tests. Optimizer 224 may start with initial value range(s) 252 (or a derivation thereof) as the values of the adjusted parameter values 290 and provide the adjusted parameter values 290 to test runner 210 to trigger a batch 212 of simulated driving tests using on the initial value range(s) 252 (or the derivation thereof).

Optimizer 224 may trigger test runner 210 to run or execute simulated driving tests or batches of simulated driving tests, so that results, referred to as test bags 280, of the executed simulated driving tests can be provided to test bag analyzer 222. Test bags 280 may include various locations and/or kinematics data of the simulated ego vehicle, other vehicle(s), other simulated road users, and/or simulated road objects during the simulated driving test execution. In some cases, the final locations of the simulated ego vehicle, other vehicle(s), other simulated road users, and/or simulated road objects at the end of the simulated driving test execution may be recorded as a part of test bags 280. Test bags 280 may include logs of the simulated ego vehicle (e.g., sensor logs, data logs, etc.).

Test bag analyzer 222 may evaluate and analyze test bags 280 to obtain one or more criticality scores 226. In some cases, test bag analyzer 222 may evaluate and analyze test bags 280 to obtain one or more metrics 228. Optimizer 224 may evaluate an objective function based on the one or more criticality scores 226 (and optionally the one or more metrics 228, if desired), and find optimized parameter values 232 that would optimize the objective function. Optimizer 224 may find next values to try and provide those values as adjusted parameter values 290 to trigger test runner 210 to execute further simulated driving tests or further batches of simulated driving tests. Optimizer 224 may finally return optimized parameter values 232 that optimizes the objective function.

In some cases, test runner 210 may execute simulated driving tests in the same manner as simulation platform 150. In some cases, test runner 210 may execute simulated driving tests using a surrogate simulation platform that is less computationally expensive than the simulation platform 150. Simulation fidelity of the surrogate simulation platform may be lower than the simulation fidelity of the simulation platform 150. The surrogate simulation platform can execute simulated driving tests to record test bags 280 that would allow for one or more criticality scores to be computed.

In some cases, optimizer 224 may trigger test runner 210 to execute a batch 212 of simulated driving tests to be executed in parallel on cluster infrastructure. In some cases, the optimization algorithm may randomly sample the space of the one or more decision variables 230 to find or derive the optimal parameter values 232. Parallel execution of the simulated driving tests can improve the speed at which the optimization algorithm would find the optimal parameter values 232. In some cases, optimizer 224 may trigger an ephemeral batch 212 simulated driving tests to be executed by test runner 210 (e.g., without committing the tests to a repository).

Optimizer 224 may implement an optimization algorithm that searches for optimal values for one or more decision variables 230 that would yield an optimized value of an objective function. Examples of suitable optimization algorithms include iterative methods (e.g., gradient descent), heuristic methods (e.g., genetic algorithms, hill climbing with random restart). The optimal values can be output as optimized parameter values 232. Optimizer 224 may offer significant benefit for finding optimal values or optimal value ranges for two or more one or more decision variables 230, since it is not practical for a user to determine optimal values when many one or more decision variables 230 can be varied to optimize the objective function.

Optimizer constraint(s) 250 can limit or bound the search that is being performed by the optimization algorithm in optimizer 224. The optimizer constraint(s) 250 limits the executions of simulated driving tests in test runner 210 to tests that meet the optimizer constraint(s) 250. For example, a user may provide numerical bounds for the one or more decision variables 230, e.g., minimum speed of a simulated road user and maximum speed of a simulated road user. In another example, a user may provide semantic constraints that limit behaviors and/or interactions of the simulated ego vehicle, simulated road users, and/or simulated road objects. In yet another example, a user may provide a maximum number of iterations, and a number of batches of simulated driving tests to be triggered by optimizer 224 to be executed in test runner 210 may not exceed the maximum number of iterations. In some cases, the maximum number of iterations may be set an algorithm that determines the maximum number of iterations based on a current amount and/or current cost of resources available in cluster infrastructure.

Examples of optimizer constraint(s) 250 may include:

Constraining values of a decision variable to a numerical range or a numerical bound, Constraining the execution of simulated driving tests to executions that initializes one or more other simulated road users or simulated road objects upon the simulated ego vehicle meeting a criterion of the driving scenario, Constraining the execution of simulated driving tests to executions that initializes the simulated ego vehicle at an initial distance, Constraining the executions of simulated driving tests to executions that initializes the simulated ego vehicle at an initial speed (e.g., speed of the lane that the simulated ego vehicle is in), Constraining the executions of simulated driving tests to executions that initializes one or more other simulated road users or simulated road objects to have an initial speed that meets a minimum speed value, A maximum number of iterations to perform by the optimization algorithm before finalizing the optimized parameter values 232, if the optimization algorithm iteratively determines values for decision variable(s) that optimizes the objective function, and A maximum number of simulated driving tests (or batches of simulated driving tests) to execute before finalizing the optimized parameter values 232.

The objective function may be defined based on the intent of the simulated driving test (e.g., specific sequences of events and interactions, a critical interaction of a driving scenario). The objective function can quantify or measure whether a given simulated driving resulted in a critical interaction in accordance with the intent of the simulated driving test. The objective function can measure a safety level of a simulated ego vehicle within a given simulated driving test execution. The objective function can measure a comfort level of the simulated ego vehicle within a given simulated driving test execution. The objective function can include one or more criticality scores. The objective function can include a sum of criticality scores. The objective function can include a weighted sum of criticality scores. Examples of criticality scores that can be extracted from results of the simulated driving tests may include:

- A minimum time to collision for the simulated ego vehicle in the given simulated driving test execution,
- A maximum deceleration value for the simulated ego vehicle in the given simulated driving test execution,
- Post-encroachment time for the simulated ego vehicle in the given simulated driving test execution,
- Collision probability for the simulated ego vehicle in the given simulated driving test execution,
- Collision severity for the simulated ego vehicle in the given simulated driving test execution, and
- Whether a collision occurred with the simulated ego vehicle in the given simulated driving test execution.

Exemplary Metrics to Measure Quality of the Simulated Driving Tests

Besides finding the one or more criticality scores 226, test bag analyzer 222 may evaluate the results of simulated driving tests being executed by test runner 210 to obtain one or more metrics 228. The one or more metrics 228 can indicate whether the executed simulated driving tests captured the driving scenario. One or more metrics 228 of a suite of simulated driving tests may be aggregated to measure how well the suite of simulated driving tests capture a driving scenario, such as an optimized suite of simulated driving tests using the optimized parameter values 232. One or more metrics 228 may be aggregated in the form of a percentage or proportion of tests in a suite of simulated driving tests that meet a given metric. Users may determine from the one or more metrics 228 whether parameter tuning may need to be performed again (e.g., with different inputs to optimizer 224), and/or if the objective function should be adjusted. Users may determine from one or more metrics 228 whether to include a given simulated driving test in the optimized suite of simulated driving tests. Examples of one or more metrics 228 may include:

- A metric that indicates whether the simulated ego vehicle completes a driving maneuver (e.g., UPL),
- A metric that indicates whether the simulated ego vehicle enters a turning lane (e.g., UPL lane) to complete a turning maneuver,
- A metric that indicates whether the simulated ego vehicle aborts a driving maneuver (e.g., simulated ego vehicle is stuck in an intersection), and
- A metric that indicates whether the simulated ego vehicle and another simulated vehicle both enter a conflict region (e.g., a predefined region in the virtual-world environment).

Exemplary Driving Scenarios and Exemplary Parameters

Figure 3:
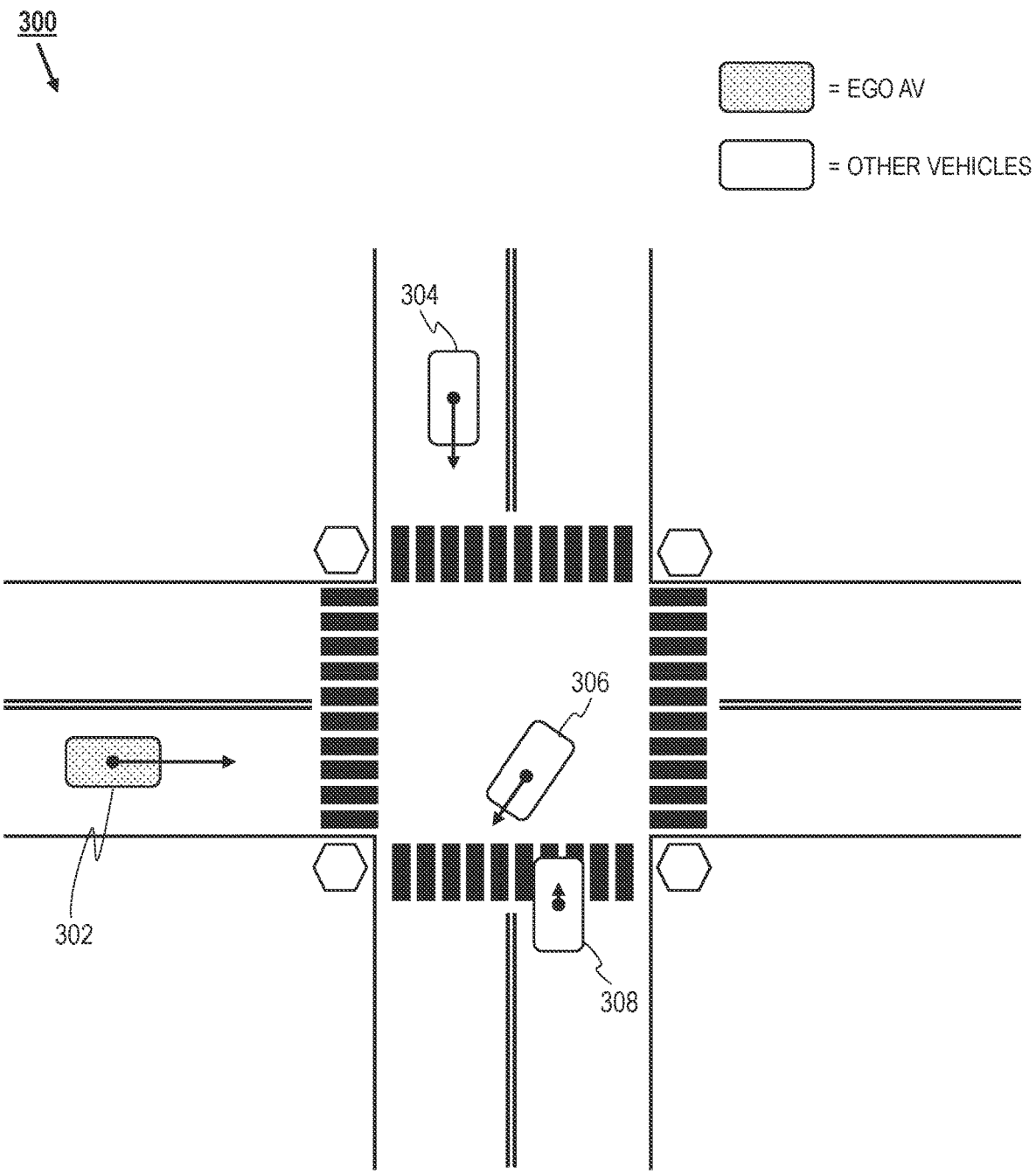
FIG. 3 illustrates one exemplary driving scenario and exemplary parameters that are tunable, according to some aspects of the disclosed technology.

FIG. 3 illustrates one exemplary driving scenario and exemplary parameters that are tunable, according to some aspects of the disclosed technology. Bird's eye view 300 illustrates a 4-way stop intersection. The driving scenario may include identifying assertive vehicles and making through the intersection in accordance with traffic rules. A simulated driving test to capture the driving scenario may include a simulated ego AV 302, a first vehicle 304, a second vehicle 306, and a third vehicle 308. Exemplary parameters may be tunable by parameter tuner 220 can include: initial velocity, acceleration, direction of travel, and position of the simulated ego AV 302, the first vehicle 304, the second vehicle 306, and the third vehicle 308, initial distance of simulated ego AV 302 to each one of the first vehicle 304, the second vehicle 306, and the third vehicle 308, etc.

Figure 4:
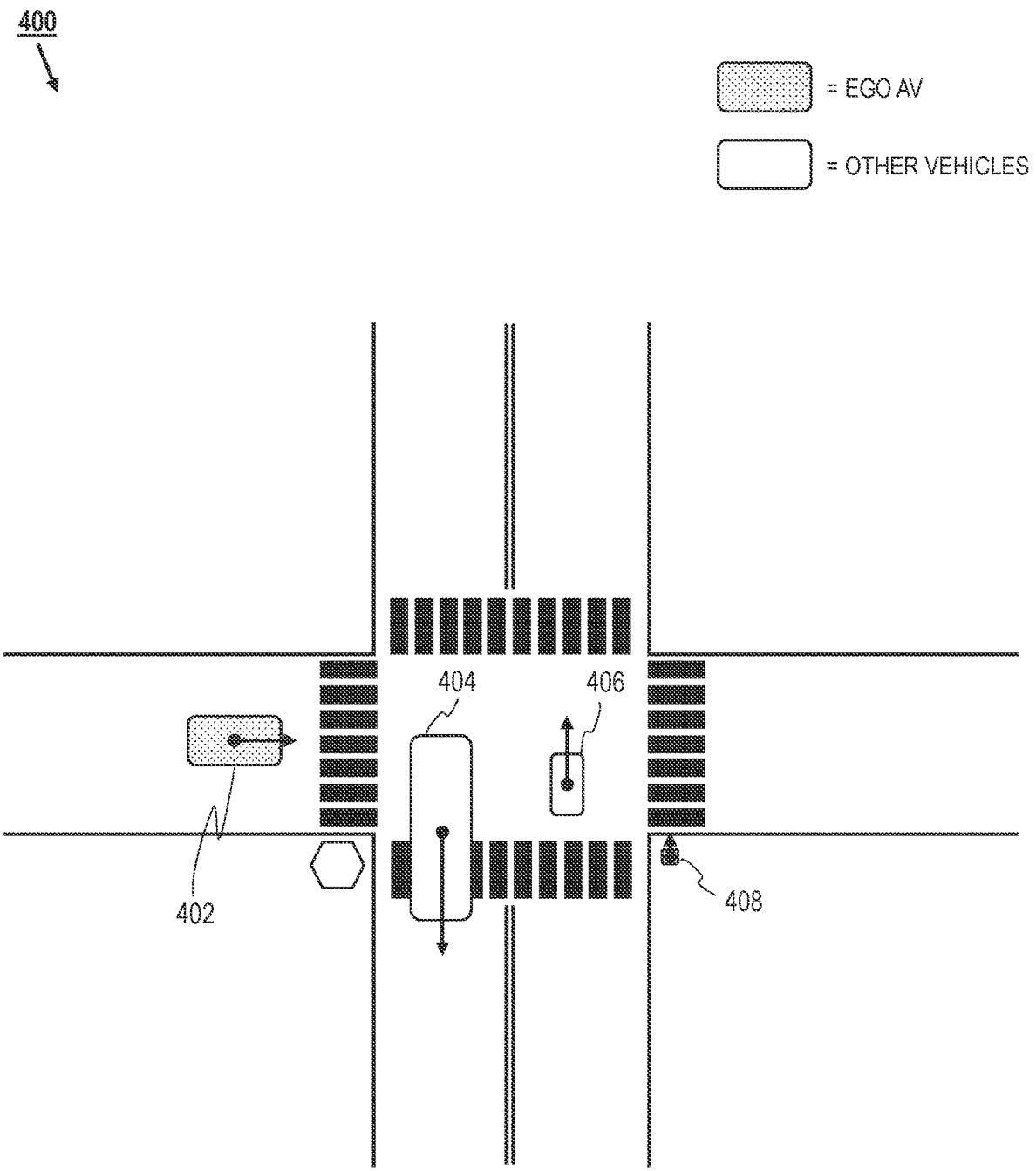
FIG. 4 illustrates another exemplary driving scenario and exemplary parameters that are tunable, according to some aspects of the disclosed technology.

FIG. 4 illustrates another exemplary driving scenario and exemplary parameters that are tunable, according to some aspects of the disclosed technology. Bird's eye view 400 illustrates an intersection of a two-way street and a one-way street. The driving scenario may include identifying space in the two-way street, crossing the two-way street to make it through the intersection to the other side. A simulated driving test to capture the driving scenario may include a simulated ego AV 402, a first vehicle 404, a second vehicle 406, and a pedestrian 408. Exemplary parameters may be tunable by parameter tuner 220 can include: initial velocity, acceleration, direction of travel, and position of the simulated ego AV 402, the first vehicle 404, the second vehicle 406, and the pedestrian 408, initial distance of simulated ego AV 302 to each one of the first vehicle 404, the second vehicle 406, and the pedestrian 408, etc.

Figure 5:
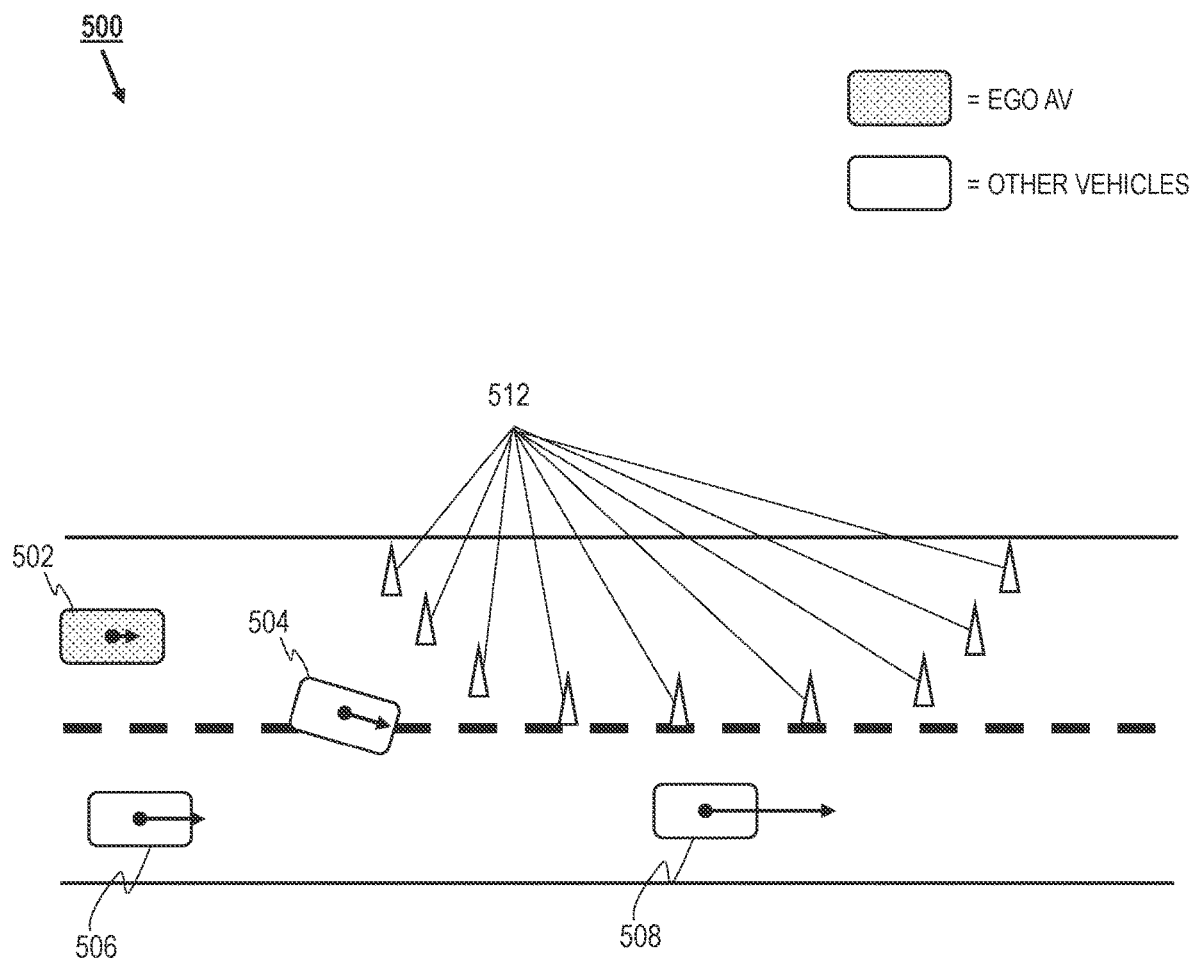
FIG. 5 illustrates yet another exemplary driving scenario and exemplary parameters that are tunable, according to some aspects of the disclosed technology.

FIG. 5 illustrates yet another exemplary driving scenario and exemplary parameters that are tunable, according to some aspects of the disclosed technology. Bird's eye view 500 illustrates a two-lane street. The driving scenario may include identifying a roadblock and performing a zipper merge. A simulated driving test to capture the driving scenario may include a simulated ego AV 502, a first vehicle 504, a second vehicle 506, a third vehicle 508, and construction cones 512. Exemplary parameters may be tunable by parameter tuner 220 can include: initial velocity, acceleration, direction of travel, and position of the simulated ego AV 502, the first vehicle 504, the second vehicle 506, and the third vehicle 508, initial distance of simulated ego AV 302 to each one of the first vehicle 504, the second vehicle 506, and the third vehicle 508, the number of construction cones 512, the positions of the construction cones 512, the size of the area or region blocked by the construction cones 512, etc.

These exemplary parameters illustrated in FIGS. 3-5 can impact whether the simulated driving test would result in a critical interaction, and the parameter tuner 220 can find optimal values or optimal value ranges for the parameters that can result in a suite of simulated driving tests that can allows AV software to be tested, evaluated, and validated meaningfully.

Exemplary Method for Tuning One or More Parameters

Figure 6:
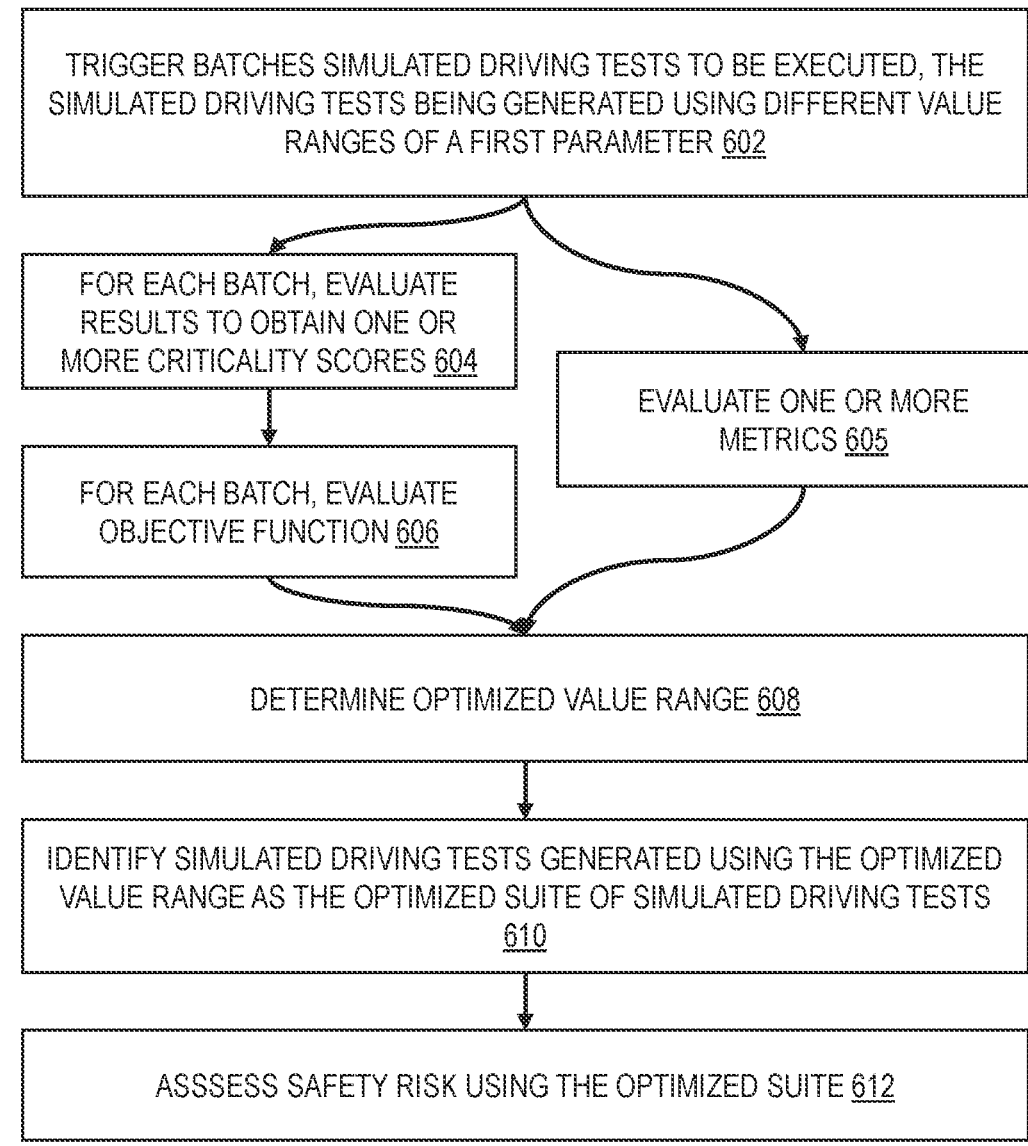
FIG. 6 is a flow diagram of an exemplary method for tuning one or more parameters used to generate an optimized suite of simulated driving tests that places a simulated ego vehicle in a driving scenario, according to some aspects of the disclosed technology.

FIG. 6 is a flow diagram 600 of an exemplary method for tuning one or more parameters used to obtain an optimized suite of simulated driving tests that places a simulated ego vehicle in a driving scenario, according to some aspects of the disclosed technology. The method may be carried out by components illustrated in FIG. 2, such as parameter tuner 220.

In 602, an optimizer, e.g., optimizer 224 of FIG. 2, may trigger batches of simulated driving tests to be executed, e.g., by test runner 210 of FIG. 2. The batches of simulated driving tests can be generated using different value ranges of a first parameter.

In 604, for each batch of executed simulated driving tests, an analyzer, e.g., test bag analyzer 222 of FIG. 2 can evaluate results of the executed simulated driving tests to obtain one or more criticality scores for each executed simulated driving test in the batch of executed simulated driving tests.

In 606, for each batch of executed simulated driving tests, the optimizer may evaluate an objective function that includes the one or more criticality scores.

In 608, the optimizer may determine an optimized value range for the first parameter that optimizes the objective function.

In 610, the optimizer may identify simulated driving tests generated using the optimized value range of the first parameter as the optimized suite of simulated driving tests. The optimized suite of simulated driving tests can be generated using the optimized value range of the first parameter. The optimized suite of simulated driving tests can be published so that the tests can be executed by a simulation platform, e.g., simulation platform 150 of FIGS. 1 and 2, for AV software performance and/or safety evaluation purposes. The simulation platform may use and execute the optimized suite of simulated driving tests to assess safety risk in the driving scenario for different versions of AV software.

In some embodiments, triggering the batches of simulated driving tests in 602 may include triggering a first batch of simulated driving tests to be executed in parallel on cluster infrastructure, e.g., test runner 210 of FIG. 2.

In some embodiments, triggering the batches of simulated driving tests in 602 may include triggering ephemeral tests to be executed on cluster infrastructure, e.g., test runner 210 of FIG. 2. Triggering ephemeral tests may include provisioning execution environments on cluster infrastructure, triggering a first batch of simulated driving tests to be executed on the execution environments on cluster infrastructure, terminating the execution environments upon completion of executions of the first batch of simulated driving tests. Triggering ephemeral tests may avoid committing the simulated driving tests to a repository. Triggering ephemeral tests may ensure that resources on cluster infrastructure are used for a limited period of time, or temporarily.

In some embodiments, triggering the batches of simulated driving tests in 602 may include performing a search for the optimized parameter values. The search may include determining the different value ranges of the first parameter based on an optimization algorithm that searches for the optimized value range that optimizes the objective function.

In some embodiments, triggering the batches of simulated driving tests in 602 may include receiving an initial value range for the first parameter from a user, and determining the different value ranges of the first parameter based on the initial value range for the first parameter (e.g., as a seed or guide for the search).

In some embodiments, triggering the batches of simulated driving tests in 602 may include receiving constraints, e.g., numerical bounds for the different value ranges for the first parameter from a user. The optimizer may determine the different value ranges of the first parameter within the constraints, e.g., the numerical bounds.

In some embodiments, the method may be used to tune more than one parameter. The optimizer may implement the optimization algorithm to search for optimal values for one or more other parameters besides searching for the optimal values for the first parameter. The batches of simulated driving tests can be further generated using different value ranges of a second parameter. The method may further include determining a further optimized value range for the second parameter that optimizes the objective function jointly with the optimized value range for the first parameter. The optimized suite of simulated driving tests can be identified further using the further optimized value range of the second parameter.

In some embodiments, in 605, an analyzer, e.g., test bag analyzer 222 of FIG. 2, may evaluate results of the executed simulated driving tests to obtain one or more metrics that indicate whether the executed simulated driving tests captured the driving scenario. An optimizer, e.g., optimizer 224, may aggregate the one or more metrics for the optimized suite of simulated driving tests to determine suite-level metrics of optimized suite of simulated driving tests.

Exemplary AV Management System

Figure 7:
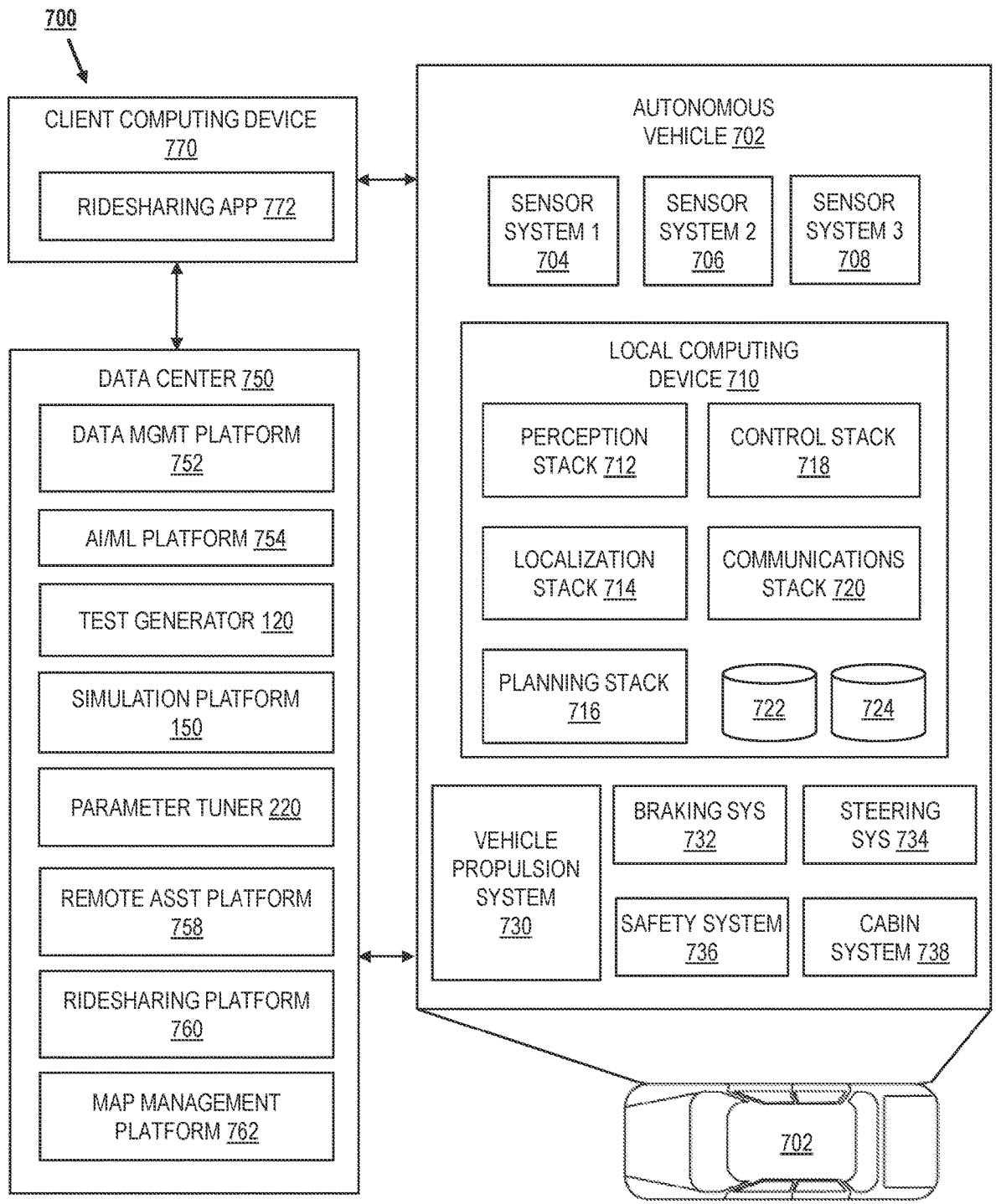
FIG. 7 illustrates an exemplary system environment that can be used to manage and support one or more AVs, according to some aspects of the disclosed technology.

Turning now to FIG. 7, this figure illustrates an example of an AV management system 700. One of ordinary skill in the art will understand that, for the AV management system 700 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 700 includes an AV 702, a data center 750, and a client computing device 770. The AV 702, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 702 can navigate about roadways without a human driver based on sensor signals generated by multiple sensor systems 704, 706, and 708. The sensor systems 704-708 can include different types of sensors and can be arranged about the AV 702. For instance, the sensor systems 704-708 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 704 can be a camera system, the sensor system 706 can be a LIDAR system, and the sensor system 708 can be a RADAR system. Other embodiments may include any other number and type of sensors.

AV 702 can also include several mechanical systems that can be used to maneuver or operate AV 702. For instance, the mechanical systems can include vehicle propulsion system 730, braking system 732, steering system 734, safety system 736, and cabin system 738, among other systems. Vehicle propulsion system 730 can include an electric motor, an internal combustion engine, or both. The braking system 732 can include an engine brake, a wheel braking system (e.g., a disc braking system that utilizes brake pads), hydraulics, actuators, and/or any other suitable componentry configured to assist in decelerating AV 702. The steering system 734 can include suitable componentry configured to control the direction of movement of the AV 702 during navigation. Safety system 736 can include lights and signal indicators, a parking brake, airbags, and so forth. The cabin system 738 can include cabin temperature control systems, in-cabin entertainment systems, and so forth. In some embodiments, the AV 702 may not include human driver actuators (e.g., steering wheel, handbrake, foot brake pedal, foot accelerator pedal, turn signal lever, window wipers, etc.) for controlling the AV 702. Instead, the cabin system 738 can include one or more client interfaces (e.g., Graphical User Interfaces (GUIs), Voice User Interfaces (VUIs), etc.) for controlling certain aspects of the mechanical systems 730-738.

AV 702 can additionally include a local computing device 710 that is in communication with the sensor systems 704-708, the mechanical systems 730-738, the data center 750, and the client computing device 770, among other systems. The local computing device 710 can include one or more processors and memory, including instructions that can be executed by the one or more processors. The instructions can make up one or more software stacks or components responsible for controlling the AV 702; communicating with the data center 750, the client computing device 770, and other systems; receiving inputs from riders, passengers, and other entities within the AV's environment; logging metrics collected by the sensor systems 704-708; and so forth. In this example, the local computing device 710 includes a perception stack 712, a mapping and localization stack 714, a planning stack 716, a control stack 718, a communications stack 720, a High Definition (HD) geospatial database 722, and an AV operational database 724, among other stacks and systems.

Perception stack 712 can enable the AV 702 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 722, other components of the AV, and other data sources (e.g., the data center 750, the client computing device 770, third-party data sources, etc.). The perception stack 712 can detect and classify objects and determine their current and predicted locations, speeds, directions, and the like. In addition, the perception stack 712 can determine the free space around the AV 702 (e.g., to maintain a safe distance from other objects, change lanes, park the AV, etc.). The perception stack 712 can also identify environmental uncertainties, such as where to look for moving objects, flag areas that may be obscured or blocked from view, and so forth.

Mapping and localization stack 714 can determine the AV's position and orientation (pose) using different methods from multiple systems (e.g., GPS, IMUs, cameras, LIDAR, RADAR, ultrasonic sensors, the HD geospatial database 722, etc.). For example, in some embodiments, the AV 702 can compare sensor data captured in real-time by the sensor systems 704-708 to data in the HD geospatial database 722 to determine its precise (e.g., accurate to the order of a few centimeters or less) position and orientation. The AV 702 can focus its search based on sensor data from one or more first sensor systems (e.g., GPS) by matching sensor data from one or more second sensor systems (e.g., LIDAR). If the mapping and localization information from one system is unavailable, the AV 702 can use mapping and localization information from a redundant system and/or from remote data sources.

The planning stack 716 can determine how to maneuver or operate the AV 702 safely and efficiently in its environment. For example, the planning stack 716 can receive the location, speed, and direction of the AV 702, geospatial data, data regarding objects sharing the road with the AV 702 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 702 from one point to another. The planning stack 716 can determine multiple sets of one or more mechanical operations that the AV 702 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 716 can select from multiple backup plans to carry out. For example, while preparing to change lanes to turn right at an intersection, another vehicle may aggressively cut into the destination lane, making the lane change unsafe. The planning stack 716 could have already determined an alternative plan for such an event, and upon its occurrence, help to direct the AV 702 to go around the block instead of blocking a current lane while waiting for an opening to change lanes.

The control stack 718 can manage the operation of the vehicle propulsion system 730, the braking system 732, the steering system 734, the safety system 736, and the cabin system 738. The control stack 718 can receive sensor signals from the sensor systems 704-708 as well as communicate with other stacks or components of the local computing device 710 or a remote system (e.g., the data center 750) to effectuate operation of the AV 702. For example, the control stack 718 can implement the final path or actions from the multiple paths or actions provided by the planning stack 716. This can involve turning the routes and decisions from the planning stack 716 into commands for the actuators that control the AV's steering, throttle, brake, and drive unit.

The communication stack 720 can transmit and receive signals between the various stacks and other components of the AV 702 and between the AV 702, the data center 750, the client computing device 770, and other remote systems. The communication stack 720 can enable the local computing device 710 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 720 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 722 can store HD maps and related data of the streets upon which the AV 702 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 724 can store raw AV data generated by the sensor systems 704-708 and other components of the AV 702 and/or data received by the AV 702 from remote systems (e.g., the data center 750, the client computing device 770, etc.). In some embodiments, the raw AV data can include HD LIDAR point cloud data, image or video data, RADAR data, GPS data, and other sensor data that the data center 750 can use for creating or updating AV geospatial data as discussed further below with respect to FIG. 7 and elsewhere in the present disclosure.

The data center 750 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 750 can include one or more computing devices remote to the local computing device 710 for managing a fleet of AVs and AV-related services. For example, in addition to managing the AV 702, the data center 750 may also support a ridesharing service, a delivery service, a remote/roadside assistance service, street services (e.g., street mapping, street patrol, street cleaning, street metering, parking reservation, etc.), and the like.

The data center 750 can send and receive various signals to and from the AV 702 and the client computing device 770. These signals can include sensor data captured by the sensor systems 704-708, roadside assistance requests, software updates, ridesharing pick-up and drop-off instructions, and so forth. In this example, the data center 750 includes one or more of a data management platform 752, an Artificial Intelligence/Machine Learning (AI/ML) platform 754, a simulation platform 150, test generator 120, and parameter tuner 220, a remote assistance platform 758, a ridesharing platform 760, and a map management platform 762, among other systems.

Data management platform 752 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 750 can access data stored by the data management platform 752 to provide their respective services.

The AI/ML platform 754 can provide the infrastructure for training and evaluating machine learning algorithms for operating the AV 702, the remote assistance platform 758, the ridesharing platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The test generator 120 and simulation platform 150 can enable testing and validation of the algorithms, machine learning models, neural networks, and other development efforts for the AV 702, the remote assistance platform 758, the ridesharing platform 760, the map management platform 762, and other platforms and systems. The test generator 120 and simulation platform 150 can replicate a variety of driving environments and/or reproduce real-world scenarios from data captured by the AV 702, including rendering geospatial information and road infrastructure (e.g., streets, lanes, crosswalks, traffic lights, stop signs, etc.) obtained from the map management platform 762 (or map database 110); modeling the behavior of simulated road users and/or simulated road objects; simulating inclement weather conditions, different driving scenarios, different situations; and so on.

The remote assistance platform 758 can generate and transmit instructions regarding the operation of the AV 702. For example, in response to an output of the AI/ML platform 754 or other system of the data center 750, the remote assistance platform 758 can prepare instructions for one or more stacks or other components of the AV 702.

The ridesharing platform 760 can interact with a customer of a ridesharing service via a ridesharing application 772 executing on the client computing device 770. The client computing device 770 can be any type of computing system, including a server, desktop computer, laptop, tablet, smartphone, smart wearable device (e.g., smart watch; smart eyeglasses or other Head-Mounted Display (HMD); smart car pods or other smart in-car, on-car, or over-ear device; etc.), gaming system, or other general-purpose computing device for accessing the ridesharing application 772. The client computing device 770 can be a customer's mobile computing device or a computing device integrated with the AV 702 (e.g., the local computing device 710). The ridesharing platform 760 can receive requests to be picked up or dropped off from the ridesharing application 772 and dispatch the AV 702 for the trip.

Map management platform 762 can provide a set of tools for the manipulation and management of geographic and spatial (geospatial) and related attribute data. The data management platform 752 can receive LIDAR point cloud data, image data (e.g., still image, video, etc.), RADAR data, GPS data, and other sensor data (e.g., raw data) from one or more AVs 702, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the AV geospatial data to enable users to view, query, label, edit, and otherwise interact with the data. Map management platform 762 can manage workflows and tasks for operating on the AV geospatial data. Map management platform 762 can control access to the AV geospatial data, including granting or limiting access to the AV geospatial data based on user-based, role-based, group-based, task-based, and other attribute-based access control mechanisms. Map management platform 762 can provide version control for the AV geospatial data, such as to track specific changes that (human or machine) map editors have made to the data and to revert changes when necessary. Map management platform 762 can administer release management of the AV geospatial data, including distributing suitable iterations of the data to different users, computing devices, AVs, and other consumers of HD maps. Map management platform 762 can provide analytics regarding the AV geospatial data and related data, such as to generate insights relating to the throughput and quality of mapping tasks.

In some embodiments, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, test generator 120 and simulation platform 150 may incorporate the map viewing services for recreating and visualizing certain driving scenarios, the remote assistance platform 758 may incorporate the map viewing services for replaying traffic incidents to facilitate and coordinate aid, the ridesharing platform 760 may incorporate the map viewing services into the client application 772 to enable passengers to view the AV 702 in transit en route to a pick-up or drop-off location, and so on.

Example Processor-Based System

Figure 8:
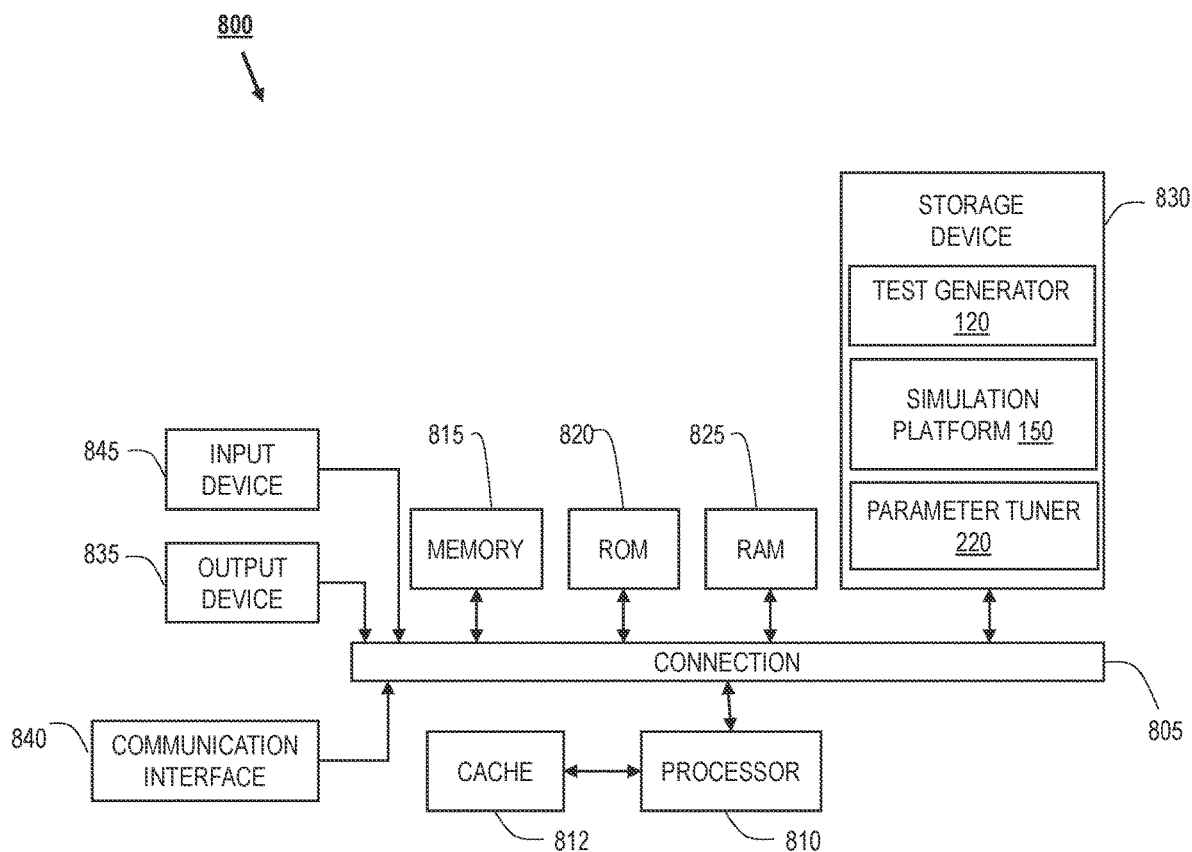
FIG. 8 illustrates an exemplary processor-based system with which some aspects of the subject technology can be implemented.

FIG. 8 illustrates an example processor-based system with which some aspects of the subject technology may be implemented. For example, processor-based system 800 may be any computing device making up, or any component thereof in which the components of the system are in communication with each other using connection 805. Connection 805 may be a physical connection via a bus, or a direct connection into processor 810, such as in a chipset architecture. Connection 805 may also be a virtual connection, networked connection, or logical connection.

In some embodiments, computing system 800 represents the client computing device 770, local computing device 710, and/or data center 750 of FIG. 7. In some embodiments, one or more of the described system components represents many such components each performing some or all of the function for which the component is described. In some embodiments, the components may be physical or virtual devices.

Example system 800 includes at least one processing unit (e.g., a central processing unit (CPU), a graphical processing unit (GPU), or another suitable processor) 810 and connection 805 that couples various system components including system memory 815, such as Read-Only Memory (ROM) 820 and Random-Access Memory (RAM) 825 to processor 810. Computing system 800 may include a cache of high-speed memory 812 connected directly with, in close proximity to, or integrated as part of processor 810.

Processor 810 may include any general-purpose processor and a hardware service or software service, such as executable instructions that implement functionalities such as methods and processes described herein. The functionalities carried out test generator 120, simulation platform 150, and parameter tuner 220 may be encoded as instructions in storage device 830. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms known to those of skill in the art. In some instances, multimodal systems may enable a user to provide multiple types of input/output to communicate with computing system 800. Computing system 800 may include communications interface 840, which may generally govern and manage the user input and system output. The communication interface may perform or facilitate receipt and/or transmission of wired or wireless communications via wired and/or wireless transceivers.

Storage device 830 may be a non-volatile and/or non-transitory and/or computer-readable memory device and may be a hard disk or other types of computer-readable media which may store data that are accessible by a computer.

Storage device 830 may include software services, servers, services, etc., that when the code that defines such software is executed by the processor 810, it causes the system 800 to perform a function. In some embodiments, a hardware service that performs a particular function may include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, optical disk storage, magnetic disk storage, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

SELECTED EXAMPLES

Example 1 is a computer-implemented method for tuning one or more parameters used to obtain an optimized suite of simulated driving tests that places a simulated ego vehicle in a driving scenario, comprising: triggering, by an optimizer, batches of simulated driving tests to be executed by a test runner, wherein the batches of simulated driving tests are generated using different value ranges of a first parameter; for each batch of executed simulated driving tests: evaluating, by a test bag analyzer, results of the executed simulated driving tests to obtain one or more criticality scores for each executed simulated driving test, and evaluating, by the optimizer, an objective function that includes the one or more criticality scores; determining, by the optimizer, an optimized value range for the first parameter that optimizes the objective function; and identifying simulated driving tests generated using the optimized value range of the first parameter as the optimized suite of simulated driving tests.

In Example 2, the computer-implemented method of Example 1 can optionally include: assessing safety risk in the driving scenario for different versions of vehicle software using the optimized suite of simulated driving tests.

In Example 3, the computer-implemented method of Example 1 or 2 can optionally include triggering the batches of simulated driving tests to be executed comprising triggering a first batch of simulated driving tests to be executed in parallel on cluster infrastructure.

In Example 4, the computer-implemented method of any one of Examples 1-3 can optionally include triggering the batches of simulated driving tests to be executed comprising: provisioning execution environments on cluster infrastructure; triggering a first batch of simulated driving tests to be executed on the execution environments on cluster infrastructure; and terminating the execution environments upon completion of executions of the first batch of simulated driving tests.

In Example 5, the computer-implemented method of any one of Examples 1-4 can optionally include triggering the batches of simulated driving tests to be executed comprising: determining the different value ranges of the first parameter based on an optimization algorithm that searches for the optimized value range that optimizes the objective function.

In Example 6, the computer-implemented method of any one of Examples 1-5 can optionally include triggering the batches of simulated driving tests to be executed comprising: receiving an initial value range for the first parameter from a user; and determining the different value ranges of the first parameter based on the initial value range for the first parameter.

In Example 7, the computer-implemented method of any one of Examples 1-6 can optionally include triggering the batches of simulated driving tests to be executed comprising: receiving numerical bounds for the different value ranges for the first parameter from a user; and determining the different value ranges of the first parameter within the numerical bounds.

In Example 8, the computer-implemented method of any one of Examples 1-7 can optionally include triggering the batches of simulated driving tests to be executed comprising: constraining the batches of simulated driving tests to executions that initializes one or more other simulated road users or simulated road objects upon the simulated ego vehicle meeting a criterion of the driving scenario.

In Example 9, the computer-implemented method of any one of Examples 1-8 can optionally include triggering the batches of simulated driving tests to be executed comprising: constraining the batches of simulated driving tests to executions that initializes the simulated ego vehicle at an initial distance.

In Example 10, the computer-implemented method of any one of Examples 1-9 can optionally include triggering the batches of simulated driving tests to be executed comprising: constraining the batches of simulated driving tests to executions that initializes the simulated ego vehicle at an initial speed.

In Example 11, the computer-implemented method of any one of Examples 1-10 can optionally include triggering the batches of simulated driving tests to be executed comprising: constraining the batches of simulated driving tests to executions that initializes one or more other simulated road users or simulated road objects to have an initial speed that meets a minimum speed value.

In Example 12, the computer-implemented method of any one of Examples 1-11 can optionally include the batches of simulated driving tests being further generated using different value ranges of a second parameter; the computer-implemented method further comprising determining a further optimized value range for the second parameter that optimizes the objective function jointly with the optimized value range for the first parameter; and the optimized suite of simulated driving tests being identified further using the further optimized value range of the second parameter.

In Example 13, the computer-implemented method of any one of Examples 1-12 can optionally include the triggering the batches of simulated driving tests to be executed comprising: receiving a maximum number of iterations (from a user), wherein a number of batches of simulated driving tests to be triggered does not exceed the maximum number of iterations.

In Example 14, the computer-implemented method of any one of Examples 1-13 can optionally include the objective function measuring a safety level of the simulated ego vehicle within a given simulated driving test execution.

In Example 15, the computer-implemented method of any one of Examples 1-14 can optionally include the objective function measures a comfort level of the simulated ego vehicle within a given simulated driving test execution.

In Example 16, the computer-implemented method of any one of Examples 1-15 can optionally include evaluating the results of the executed simulated driving tests to obtain the one or more criticality scores for each executed simulated driving test comprising: evaluating results of a given simulated driving test execution to compute a first criticality score based on a minimum time to collision for the simulated ego vehicle in the given simulated driving test execution.

In Example 17, the computer-implemented method of any one of Examples 1-16 can optionally include evaluating the results of the executed simulated driving tests to obtain the one or more criticality scores for each executed simulated driving test comprising: evaluating results of a given simulated driving test execution to compute a second criticality score based on a maximum deceleration value for the simulated ego vehicle in the given simulated driving test execution.

In Example 18, the computer-implemented method of any one of Examples 1-17 can optionally include evaluating the results of the executed simulated driving tests to obtain the one or more criticality scores for each executed simulated driving test comprising: evaluating results of a given simulated driving test execution to compute a third criticality score based on a post-encroachment time for the simulated ego vehicle in the given simulated driving test execution.

In Example 19, the computer-implemented method of any one of Examples 1-18 can optionally include evaluating the results of the executed simulated driving tests to obtain the one or more criticality scores for each executed simulated driving test comprising: evaluating results of a given simulated driving test execution to compute a fourth criticality score based on whether a collision occurred with the simulated ego vehicle in the given simulated driving test execution.

In Example 20, the computer-implemented method of any one of Examples 1-19 can optionally include evaluating results of the executed simulated driving tests to obtain one or more metrics that indicate whether the executed simulated driving tests captured the driving scenario.

In Example 21, the computer-implemented method of Example 20 can optionally include aggregating the one or more metrics for the optimized suite of simulated driving tests.

In Example 22, the computer-implemented method of Example 20 or 21 can optionally include the one or more metrics comprising a first metric that indicates whether the simulated ego vehicle completes a driving maneuver.

In Example 23, the computer-implemented method of any one of Examples 20-22 can optionally include the one or more metrics comprising a second metric that indicates whether the simulated ego vehicle enters a turning lane to complete a turning maneuver.

In Example 24, the computer-implemented method of any one of Examples 20-23 can optionally include the one or more metrics comprising a third metric that indicates whether the simulated ego vehicle aborts a driving maneuver.

In Example 25, the computer-implemented method of any one of Examples 20-24 can optionally include the one or more metrics comprising a fourth metric that indicates whether the simulated ego vehicle and another simulated vehicle both enters a conflict region.

In Example 26, the computer-implemented method of any one of Examples 1-25 can optionally include the first parameter being an initial velocity of a simulated road user or a simulated road object.

In Example 27, the computer-implemented method of any one of Examples 1-25 can optionally include the first parameter being an initial acceleration of a simulated road user or a simulated road object.

In Example 28, the computer-implemented method of any one of Examples 1-25 can optionally include the first parameter being an initial position of a simulated road user or a simulated road object.

In Example 29, the computer-implemented method of any one of Examples 1-25 can optionally include the first parameter being an initial velocity of the simulated ego vehicle.

In Example 30, the computer-implemented method of any one of Examples 1-25 can optionally include the first parameter being an initial acceleration of the simulated ego vehicle.

In Example 31, the computer-implemented method of any one of Examples 1-25 can optionally include the first parameter being an initial position of the simulated ego vehicle.

In Example 32, the computer-implemented method of any one of Examples 1-25 can optionally include the first parameter being a number of instances of a simulated road user or a simulated road object.

In Example 33, the computer-implemented method of any one of Examples 1-25 can optionally include the first parameter being a size of a simulated road user or a simulated road object.

In Example 34, the computer-implemented method of any one of Examples 1-25 can optionally include the first parameter being a time of day.

In Example 35, the computer-implemented method of any one of Examples 1-25 can optionally include the first parameter being the driving scenario including the simulated ego vehicle attempting an unprotected left turn.

Example 36 is a computing system in cluster infrastructure for tuning one or more parameters used to obtain an optimized suite of simulated driving tests that places a simulated ego vehicle in a driving scenario, comprising: one or more processors, and one or more storage media encoding instructions executable by the one or more processors, wherein the instructions implement: a test runner to execute simulated driving tests and generate results; and an optimizer to: trigger batches of simulated driving tests to be executed by the test runner, wherein the batches of simulated driving tests are generated using different value ranges of a first parameter; evaluate, for each batch of executed simulated driving tests, an objective function that includes the one or more criticality scores, wherein the one or more criticality scores for each executed simulated driving test are obtained by evaluating results of the executed simulated driving tests; determine an optimized value range for the first parameter that optimizes the objective function; and identify simulated driving tests generated using the optimized value range of the first parameter as the optimized suite of simulated driving tests.

In Example 37, the computing system of Example 36 can optionally include instructions that implement any one of the computer-implemented methods of Examples 2-35.

Example 38 includes one or more non-transitory computer-readable medium having instructions stored thereon for tuning one or more parameters used to obtain an optimized suite of simulated driving tests that places a simulated ego vehicle in a driving scenario, that, when executed by one or more processors, cause the one or more processors to: trigger batches of simulated driving tests to be executed, wherein the batches of simulated driving tests are generated using different value ranges of a first parameter; for each batch of executed simulated driving tests: evaluate results of the executed simulated driving tests to obtain one or more criticality scores for each executed simulated driving test, and evaluate an objective function that includes the one or more criticality scores; determine an optimized value range for the first parameter that optimizes the objective function; and identify simulated driving tests generated using the optimized value range of the first parameter as the optimized suite of simulated driving tests.

In Example 39, the one or more non-transitory computer-readable medium of Example 38 can optionally include instructions to cause the one or more processors to further implement any one of the computer-implemented methods of Examples 2-35.

Example A is an apparatus comprising means to carry out any one of the computer-implemented methods of Examples 2-35.

The various embodiments described above are provided by way of illustration only and should not be construed to limit the scope of the disclosure. For example, the principles herein apply both to optimizing parameters as well as improvement of the parameters. Various embodiments described herein may apply to simulations that evaluate software running on AVs and software running on vehicles that may rely on the software to provide assistance to drivers of the vehicles. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for tuning one or more parameters used to obtain an optimized suite of simulated driving tests that places a simulated ego vehicle in a driving scenario, comprising:
    triggering, by an optimizer, batches of simulated driving tests to be executed by a test runner, wherein the batches of simulated driving tests are generated using different value ranges of a first parameter;
    for each batch of executed simulated driving tests:
    evaluating, by a test bag analyzer, results of the executed simulated driving tests to obtain one or more criticality scores for each executed simulated driving test, and
    evaluating, by the optimizer, an objective function is a weighted sum of the one or more criticality scores, which include a minimum time to collision for the simulated ego vehicle in the simulated driving test execution, a maximum deceleration value for the simulated ego vehicle in the simulated driving test execution, a post-encroachment time for the simulated ego vehicle in the simulated driving test execution, and whether a collision occurred with the simulated ego vehicle in the simulated driving test execution;
    determining, by the optimizer, an optimized value range for the first parameter that optimizes the objective function; and
    identifying simulated driving tests generated using the optimized value range of the first parameter as the optimized suite of simulated driving tests.

2. The computer-implemented method of claim 1, further comprising: prior to deployment of any version of vehicle software on a road-going vehicle, assessing safety risk in the driving scenario for each candidate version of vehicle software by executing the optimized suite of simulated driving tests for each candidate version inside a physics simulation platform.

3. The computer-implemented method of claim 1, wherein triggering the batches of simulated driving tests to be executed comprises: triggering a first batch of simulated driving tests to be executed in parallel on cluster infrastructure.

4. The computer-implemented method of claim 1, wherein triggering the batches of simulated driving tests to be executed comprises:
    provisioning execution environments on cluster infrastructure;
    triggering a first batch of simulated driving tests to be executed on the execution environments on cluster infrastructure; and
    terminating the execution environments upon completion of executions of the first batch of simulated driving tests.

5. The computer-implemented method of claim 1, wherein triggering the batches of simulated driving tests to be executed comprises:
    determining the different value ranges of the first parameter based on an optimization algorithm that searches for the optimized value range that optimizes the objective function.

6. The computer-implemented method of claim 1, wherein:
    the batches of simulated driving tests are further generated using different value ranges of a second parameter;
    the computer-implemented method further comprises determining a further optimized value range for the second parameter that optimizes the objective function jointly with the optimized value range for the first parameter; and
    the optimized suite of simulated driving tests are identified further using the further optimized value range of the second parameter,
    wherein the joint optimization of the first parameter and the second parameter is performed using an optimization algorithm.

7. The computer-implemented method of claim 1, wherein the triggering the batches of simulated driving tests to be executed comprises:
    receiving a maximum number of iterations, wherein a number of batches of simulated driving tests to be triggered does not exceed the maximum number of iterations.

8. The computer-implemented method of claim 1, wherein the objective function measures a safety level of the simulated ego vehicle within a given simulated driving test execution.

9. The computer-implemented method of claim 1, wherein the objective function measures a comfort level of the simulated ego vehicle within a given simulated driving test execution.

10. The computer-implemented method of claim 1, wherein evaluating the results of the executed simulated driving tests to obtain the one or more criticality scores for each executed simulated driving test comprises:
    evaluating results of a given simulated driving test execution to compute a first criticality score based on the minimum time to collision for the simulated ego vehicle in the given simulated driving test execution.

11. The computer-implemented method of claim 1, wherein evaluating the results of the executed simulated driving tests to obtain the one or more criticality scores for each executed simulated driving test comprises:
    evaluating results of a given simulated driving test execution to compute a second criticality score based on the maximum deceleration value for the simulated ego vehicle in the given simulated driving test execution.

12. The computer-implemented method of claim 1, wherein evaluating the results of the executed simulated driving tests to obtain the one or more criticality scores for each executed simulated driving test comprises:
    evaluating results of a given simulated driving test execution to compute a third criticality score based on the post-encroachment time for the simulated ego vehicle in the given simulated driving test execution.

13. The computer-implemented method of claim 1, wherein evaluating the results of the executed simulated driving tests to obtain the one or more criticality scores for each executed simulated driving test comprises:

evaluating results of a given simulated driving test execution to compute a fourth criticality score based on whether the collision occurred with the simulated ego vehicle in the given simulated driving test execution.

14. The computer-implemented method of claim 1, further comprising:

evaluating results of the executed simulated driving tests to obtain one or more metrics that indicate whether the executed simulated driving tests captured the driving scenario.

15. The computer-implemented method of claim 14, further comprising:

aggregating the one or more metrics for the optimized suite of simulated driving tests.

16. The computer-implemented method of claim 14, wherein the one or more metrics comprises one or more of: a first metric that indicates whether the simulated ego vehicle completes a driving maneuver, wherein the first metric is derived by comparing a sequence of lanes traversed by the simulated ego vehicle to the scenario specification, a second metric that indicates whether the simulated ego vehicle enters a turning lane to complete a turning maneuver, wherein the second metric is derived by comparing a sequence of lanes traversed by the simulated ego vehicle to the scenario specification, a third metric that indicates whether the simulated ego vehicle aborts a driving maneuver, and a fourth metric that indicates whether the simulated ego vehicle and another simulated vehicle both enters a conflict region, wherein the fourth metric is derived by testing whether bounding volume of the simulated ego vehicle and the other simulated vehicle overlap a stored conflict region geometry extracted from the scenario database.

17. The computer-implemented method of claim 1, wherein the first parameter is one of the following:

an initial velocity of a simulated road user or a simulated road object, an initial acceleration of a simulated road user or a simulated road object, an initial position of a simulated road user or a simulated road object, an initial velocity of the simulated ego vehicle, an initial acceleration of the simulated ego vehicle, and an initial position of the simulated ego vehicle.

18. The computer-implemented method of claim 1, wherein the first parameter is one of the following:

a number of instances of a simulated road user or a simulated road object, a size of a simulated road user or a simulated road object, and a time of day.

19. A computing system in cluster infrastructure for tuning one or more parameters used to obtain an optimized suite of simulated driving tests that places a simulated ego vehicle in a driving scenario, comprising:

one or more processors, and one or more storage media encoding instructions executable by the one or more processors, wherein the instructions implement:

a test runner to execute simulated driving tests and generate results; and an optimizer to:

provision execution environments on cluster infrastructure, trigger batches of simulated driving tests to be executed by the test runner, wherein the batches of simulated driving tests are generated using different value ranges of a first parameter and are executed on the execution environments on cluster infrastructure;

evaluate, for each batch of executed simulated driving tests, an objective function that includes one or more criticality scores, wherein the one or more criticality scores for each executed simulated driving test are obtained by evaluating results of the executed simulated driving tests;

determine an optimized value range for the first parameter that optimizes the objective function;

identify simulated driving tests generated using the optimized value range of the first parameter as the optimized suite of simulated driving tests; and terminate the execution environments upon completion of executions of the batches of simulated driving tests.

20. One or more non-transitory computer-readable medium having instructions stored thereon for tuning one or more parameters used to obtain an optimized suite of simulated driving tests that places a simulated ego vehicle in a driving scenario, that, when executed by one or more processors, cause the one or more processors to:

provision execution environments on cluster infrastructure;

trigger batches of simulated driving tests to be executed on the execution environments on cluster infrastructure, wherein the batches of simulated driving tests are generated using different value ranges of a first parameter;

for each batch of executed simulated driving tests:

evaluate results of the executed simulated driving tests to obtain one or more criticality scores for each executed simulated driving test, and evaluate an objective function is a weighted sum of the one or more criticality scores, which include a minimum time to collision for the simulated ego vehicle in the simulated driving test execution, a maximum deceleration value for the simulated ego vehicle in the simulated driving test execution, a post-encroachment time for the simulated ego vehicle in the simulated driving test execution, and whether a collision occurred with the simulated ego vehicle in the simulated driving test execution;

determine an optimized value range for the first parameter that optimizes the objective function;

identify simulated driving tests generated using the optimized value range of the first parameter as the optimized suite of simulated driving tests;

terminate the execution environments upon completion of executions of the batches of simulated driving tests.

* * * * *